United States Patent
Hagiuda

(10) Patent No.: US 8,671,297 B2
(45) Date of Patent: Mar. 11, 2014

(54) RETURNING FROM POWER SAVING MODE UPON RECEIVING A PACKET OTHER THAN SWITCH INHIBITING PACKETS CLASSIFIED AS HAVING INTERVAL SHORTER THAN SWITCH WAITING TIME TO POWER SAVING MODE

(75) Inventor: Tadashi Hagiuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 510 days.

(21) Appl. No.: 13/006,911

(22) Filed: Jan. 14, 2011

(65) Prior Publication Data
US 2011/0179294 A1 Jul. 21, 2011

(30) Foreign Application Priority Data
Jan. 18, 2010 (JP) ................................. 2010-007763

(51) Int. Cl.
G06F 1/32 (2006.01)
(52) U.S. Cl.
USPC .......................................... 713/320; 713/323
(58) Field of Classification Search
None
See application file for complete search history.

(56) References Cited

U.S. PATENT DOCUMENTS 7,548,519 B2 * 6/2009 Motegi et al. ................. 370/318
7,908,502 B2 * 3/2011 Park .............................. 713/324

FOREIGN PATENT DOCUMENTS

JP 2007-295145 A 11/2007

* cited by examiner

Primary Examiner — Kenneth Kim
(74) Attorney, Agent, or Firm — Canon USA Inc. IP Division

(57) ABSTRACT

In a multifunctional device, a packet analysis unit determines whether a received packet contributes to inhibition of a power saving mode, stores the time at which a packet is received and information indicating whether a packet is received during the power saving mode as information about the packet determined as contributing to the inhibition thereof, and calculates a period of access by a plurality of packets based on the stored information about the packet and a factor analysis unit classifies the access of which the calculated period is shorter than the waiting time of the power saving mode into an access inhibiting a shift to the power saving mode and classifies the access of which the period is not shorter than the waiting time of the power saving mode and which is made by the packet received during the power saving mode, into an access returning from the power saving mode.

8 Claims, 10 Drawing Sheets

FIG.7

| SOURCE | PERIOD (min.) | PROTOCOL | | INFO | LEVEL |
|---|---|---|---|---|---|
| 172.24.43.30 | 08:41:22 | SNMP | get-req | IF-MIB::ifPhysAddress.1 | HIGH |
| 172.24.56.69 | 10:45:42 | SNMP | get-next-req | HOST-RESOURCE-MIB::hrDeviceStatus.1,··· | HIGH |
| 172.24.150.17 | 12:03:32 | SNMP | get-next-req | HOST-RESOURCE-MIB::hrPrinterStatus.1 | HIGH |
| ··· | ··· | ··· | | ··· | ··· |
| 172.24.151.182 | 27:30:07 | SNMP | get-req | SNMPv2-MIB::sysObjectID.0 | LOW |
| 172.24.162.135 | 21:12:13 | SNMP | get-req | IF-MIB::ifPhysAddress.1 | MID |

700 SOURCE, 701 PERIOD, 702 PROTOCOL, 703 INFO, 704 LEVEL

FIG.10

| TIME | SOURCE | PROTOCOL | INFO | |
|---|---|---|---|---|
| 09:34:56 | 172.24.52.33 | SNMP | get-request | IF-MIB::ifPhysAddress.1 |
| 10:21:43 | 172.24.150.20 | SNMP | get-request | MIB-2::sysName.0  ⌐1004-1 |
| 10:55:02 | 172.24.54.198 | SNMP | get-request | HOST-RESOURCE-MIB::hrPrinterStatus.1,··· |
| 11:04:59 | 172.24.28.11 | SNMP | get-request | Printer-MIB::prtMarkerStatus.1.1 |
| 11:20:56 | 172.24.56.69 | SNMP | get-request | Printer-MIB::prtAlertCode.1 |
| 11:21:33 | 172.24.15.111 | SNMP | get-next-request | Printer-MIB::prtInputName |
| 11:21:37 | 172.24.15.111 | SNMP | get-next-request | Printer-MIB::prtInputName.1.1 |
| 11:21:41 | 172.24.15.111 | SNMP | get-next-request | Printer-MIB::prtInputName.1.2  ⌐1004-2 |
| 12:35:07 | 172.24.54.198 | SNMP | get-request | HOST-RESOURCE-MIB::hrPrinterStatus.1··· |
| 12:38:19 | 172.24.122.24 | SNMP | get-next-request | Printer-MIB::prtMarkerSuppliesLevel |
| 12:38:25 | 172.24.122.24 | SNMP | get-next-request | Printer-MIB::prtMarkerSuppliesLevel.1.1 |
| 12:45:03 | 172.24.28.11 | SNMP | get-request | Printer-MIB::prtMarkerStatus.1.1 |
| 12:49:38 | 172.24.56.69 | SNMP | get-request | Printer-MIB::prtAlertCode.1 |
| 12:57:43 | 172.24.52.33 | SNMP | get-request | IF-MIB::ifPhysAddress.1  ⌐1004-3 |
| 13:14:59 | 172.24.54.198 | SNMP | get-request | HOST-RESOURCE-MIB::hrPrinterStatus.1,··· |
| 13:25:02 | 172.24.28.11 | SNMP | get-request | Printer-MIB::prtMarkerStatus.1.1 |
| 13:34:56 | 172.24.150.120 | SNMP | get-request | MIB-2::sysLocation.0  ⌐1004-4 |
| 13:40:29 | 172.24.56.69 | SNMP | get-request | Printer-MIB::prtAlertCode.1 |
| 13:55:09 | 172.24.54.198 | SNMP | get-request | HOST-RESOURCE-MIB::hrPrinterStatus.1,··· |
| 14:05:52 | 172.24.28.11 | SNMP | get-request | Printer-MIB::prtMarkerStatus.1.1 |
| ⋮ | ⋮ | ⋮ | ⋮ | ⋮  ⌐1004-5 |

1000 1001 1002 1003

1004-0

RETURNING FROM POWER SAVING MODE UPON RECEIVING A PACKET OTHER THAN SWITCH INHIBITING PACKETS CLASSIFIED AS HAVING INTERVAL SHORTER THAN SWITCH WAITING TIME TO POWER SAVING MODE

BACKGROUND OF THE INVENTION

1. Field of the Invention

The present invention relates to a multifunctional device for analyzing and reporting the influence of an external access on a power saving mode.

2. Description of the Related Art

In recent years, a demand has been increased for reducing power consumption in electrical products by various laws and standards with a worsening global environment and economical situations as a background. Under such a situation, a power saving mode has generally been provided also for a multifunctional device.

On the other hand, a large number of software products exists which operates on a computer and monitors the state of the multifunctional device and consumables, to effectively use the multifunctional device. Although the software provides users of the multifunctional device with various pieces of information, the access inhibits the power saving mode of the multifunctional device.

For this reason, an administrator needs to realize the existence of a variety of software accessing the multifunctional device and change the setting thereof or stop thereof if required, to effectively use the power saving mode of the multifunctional device.

In order to cope with such a problem, there has been a control method for a conventional multifunctional device in which an external periodic access inhibiting the power saving mode of the multifunctional device is recorded to report the access to a user (refer to Japanese Patent Application Laid-Open No. 2007-295145).

However, in the above conventional technique, an external access apt to inhibit the power saving mode is uniformly reported, which causes a problem that it is difficult to grasp how each access affects the power saving mode of the multifunctional device.

SUMMARY OF THE INVENTION

The present invention provides a mechanism capable of grasping in detail how access to the multifunctional device affects the power saving mode.

According to an aspect of the present invention, an multifunctional device which is communicable with an external device via a network and shifts to a power saving mode in a case where a specific request is not made within a waiting time of the power saving mode includes a determination unit configured to determine whether a packet received via the network contributes to inhibition of the power saving mode, a storage unit configured to store the time at which a packet is received and information indicating whether a packet is received during the power saving mode as information about the packet determined as contributing to the inhibition thereof by the determination unit, a calculation unit configured to calculate a period of access by a plurality of packets based on the information about the packet stored in the storage unit, an analysis unit configured to compare the period of access calculated by the calculation unit with the waiting time of the power saving mode to analyze the degree of inhibition of the power saving mode and classify accesses by the plurality of packets according to the degree, and a notification unit configured to provide notification of results analyzed by the analysis unit, wherein the analysis unit classifies the access of which the period is shorter than the waiting time of the power saving mode into an access inhibiting a shift to the power saving mode and classifies the access of which the period is not shorter than the waiting time of the power saving mode and which is made by the packet received during the power saving mode into an access returning from the power saving mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present invention and, together with the description, serve to explain the principles of the invention.

FIG. 7 illustrates an example of results of an analysis process of a power-saving-mode inhibiting factor in the first exemplary embodiment.

FIG. 10 illustrates an example of results of an analysis process of a power-saving-mode inhibiting factor in the second exemplary embodiment.

DESCRIPTION OF THE EMBODIMENTS

Various exemplary embodiments, features, and aspects of the invention will be described in detail below with reference to the drawings.

Figure 1:
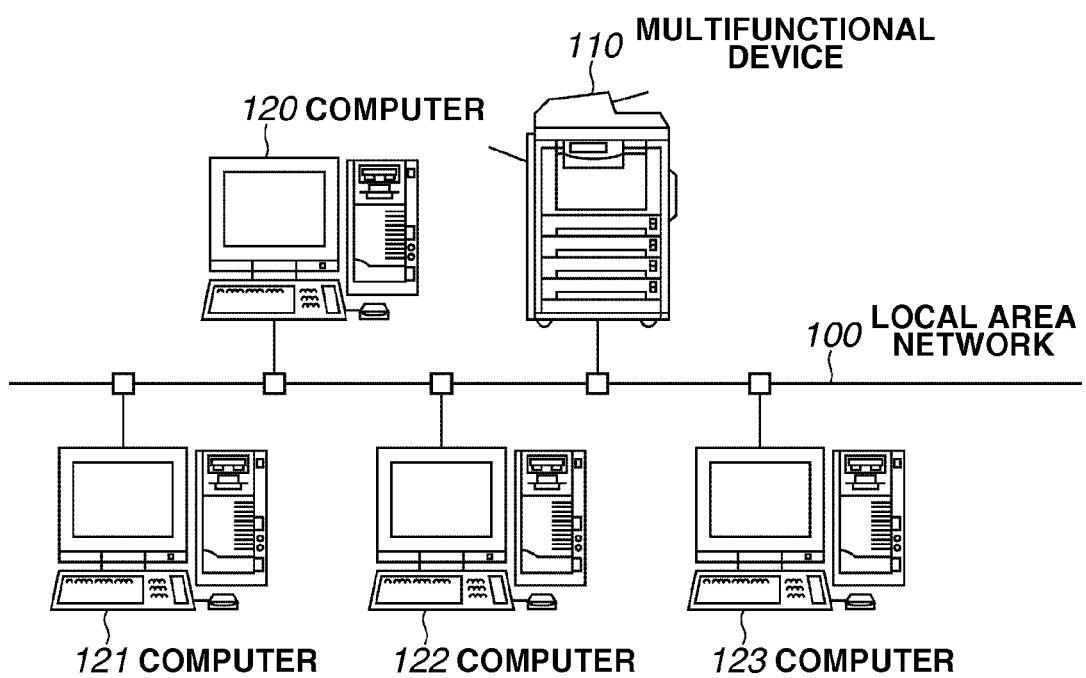
FIG. 1 illustrates a configuration of a network system including a multifunctional device according to a first exemplary embodiment of the present invention.

FIG. 1 illustrates a configuration of a network system including a multifunctional device according to a first exemplary embodiment of the present invention.

In FIG. 1, a multifunctional device 110 and computers 120, 121, 122, and 123 are communicably connected to a local area network 100.

The multifunctional device 110 has functions such as a copying machine, a scanner, a printer, and a facsimile machine. The multifunctional device 110 is provided with a function to move a normal mode to a power saving mode in which power consumption is automatically reduced if there is no request for the use of the above functions (printing request, for example) or there is no operation for inquiries about information via the network within a preset power-saving-mode standby time.

An application program for periodically inquiring of the multifunctional device 110 about information on status and the remaining amount of a consumable, and a printer driver are installed on the computers 120, 121, 122, and 123.

In the present exemplary embodiment, an SNMP is presumed as an example of a communication protocol for inquiring of the multifunctional device 110 about various pieces of information, however, the communication protocol is not limited to the SNMP. The SNMP stands for a simple network management protocol.

In the power saving mode of the multifunctional device 110, inquires from the computers 120, 121, 122, and 123 delay the timing of movement of the power saving mode or return the power saving mode to the normal mode.

The multifunctional device 110 can execute the application program in the system using a configuration described later. In the present exemplary embodiment, a power-saving-mode inhibiting factor is analyzed by the application program in the system.

Figure 2:
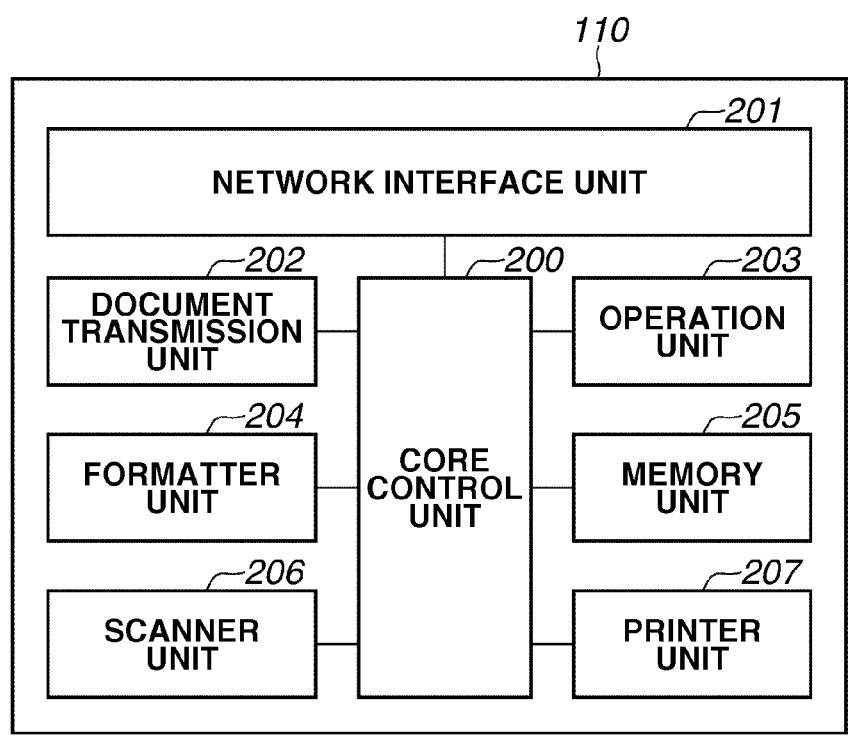
FIG. 2 is a functional block diagram of the multifunctional device.

FIG. 2 is a functional block diagram of the multifunctional device 110.

As illustrated in FIG. 2, the multifunctional device 110 includes a core control unit 200, a network interface unit 201, a document transmission unit 202, an operation unit 203, a formatter unit 204, a memory unit 205, a scanner unit 206, and a printer unit 207.

The core control unit 200 is connected to the network interface unit 201, the document transmission unit 202, the operation unit 203, the formatter unit 204, the memory unit 205, the scanner unit 206, and the printer unit 207 to integrally control each functional block. The core control unit 200 causes a processor provided in the core control unit 200 to read the application program which is installed in the memory 205 and operated in the system with a configuration described later and can execute the application program.

The network interface unit 201 is a function module for controlling communication with various network devices connected to the local area network 100, receives job control data from the computers and transmits and receives document data. The job control data include a job control command transmitted with PDL data, which is, for example, a command for developing the PDL data, printing them as image data, stapling and sorting the print, and discharging it. Inquiries about information on status and the remaining amount of a consumable from the computers 120, 121, 122, and 123 are made via the network interface unit 201.

The document transmission unit 202 is connected to the local area network 100 via the core control unit 200 and the network interface unit 201 and transmits information input from the scanner unit 206 and information stored in the memory unit 205.

The operation unit 203 is a function module for instructing the printer unit 207 and document transmission unit 202 to output a document and input a document via the scanner unit 206. Settings can be performed via the operation unit 203 on various application programs installed in the system. The operation unit 203 is equipped with a display panel and can display various messages.

The formatter unit 204 is connected to the core control unit 200 and develops the PDL data received from the computer via the network interface unit 201 into image data which can be output by the printer unit 207.

The memory unit 205 includes a storage device such as a ROM, a RAM and a hard disk (HDD) and stores image data input from the scanner unit 206, applications downloaded from the network, and other programs.

The scanner unit 206 is a function module for converting the contents of a read paper document into image data, transmitting the image data to other devices on the network via the network interface unit 201, stores the image data in the memory unit 205, and outputting the image data to the printer unit 207.

The printer unit 207 outputs image data input from the scanner unit 206 instructed by the operation unit 203 and image data received from the computer or other multifunctional devices.

Figure 3:
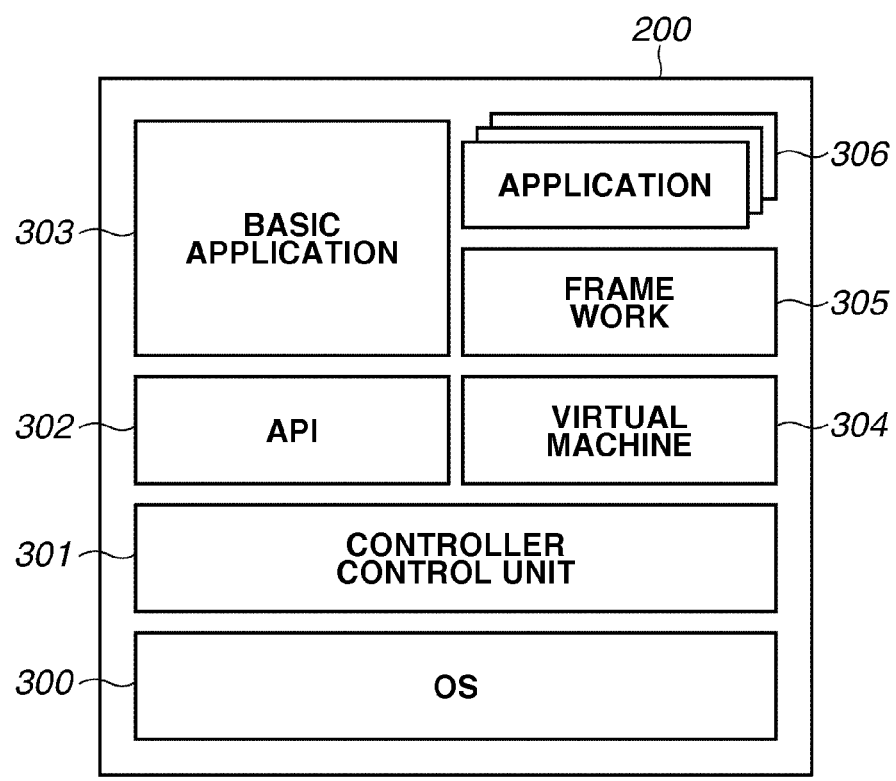
FIG. 3 is a block diagram of software stored in the memory unit of the multifunctional device and executed by a core control unit.

FIG. 3 is a block diagram of the software stored in the memory unit 205 of the multifunctional device 110 and executed by the core control unit 200.

In FIG. 3, a real time OS (operating system) 300 is a first execution environment of a program capable of controlling various functions of the multifunctional device 110 in real time.

The real time OS 300 incorporates a library group capable of controlling each function including an optional device of the multifunctional device 110 or an expansion card and a module group providing an interface command for a basic application 303 operating on a host device.

A controller control unit 301 operating on the real time OS 300 includes a module controlling the document transmission unit 202, the operation unit 203, the formatter unit 204, the scanner unit 206, and the printer unit 207.

An application programming interface 302 (hereinafter referred to as API) is a module performing a process for accessing the controller control unit 301 in accordance with the command of the basic application 303.

The basic application 303 is a module for requesting the controller control unit 301 to perform various processes using the API 302. The basic application 303 is communicable with the computers 130 and 131 on the local area network 100 via the network interface unit 201.

A second execution environment 304 is most suitable for executing a specific application which is a virtual machine realized by Java (registered trademark), for example.

A frame work 305 integrally controls the application on the virtual machine 304 being the second execution environment of the multifunctional device 110.

An application 306 operates on the virtual machine 304 of the second execution environment. The application 306 provides a function to analyze and report the power-saving-mode inhibiting factor in the present exemplary embodiment.

Figure 4:
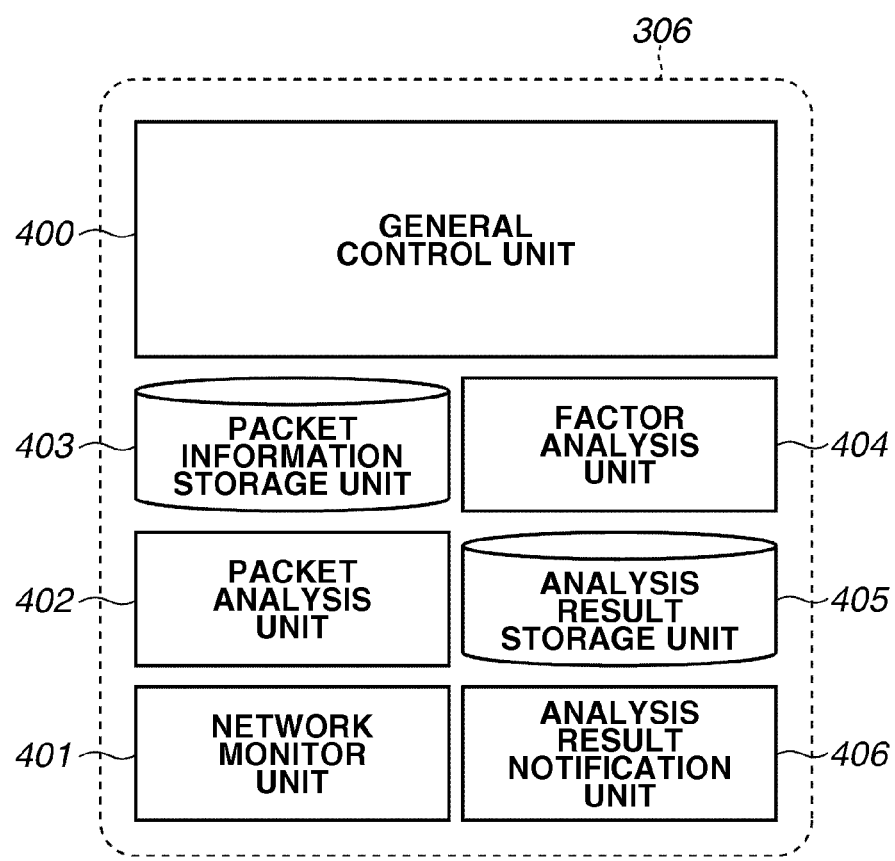
FIG. 4 is a module diagram of an application.

FIG. 4 illustrates an example of the application 306 operating on the frame work 305 of the second execution environment of the multifunctional device 110 and a module diagram of the application into which the function to analyze and report the power-saving-mode inhibiting factor is packaged.

The application 306 is downloaded from an external application providing server, for example, via the network interface unit 201, installed in the memory unit 205, and executed by the core control unit 200.

In FIG. 4, a general control unit 400 integrally controls a network monitor unit 401, a packet analysis unit 402, a packet information storage unit 403, a factor analysis unit 404, an analysis result storage unit 405, and an analysis result notification unit 406.

The network monitor unit 401 is a module for monitoring a packet to make an inquiry about information on status and the remaining amount of a consumable received from the computers 120, 121, 122, and 123 via the network interface unit 201.

The packet analysis unit 402 is a module for storing information about a packet which may contribute to the inhibition of the power saving mode out of the packets monitored by the network monitor unit 401 in the packet information storage unit 403.

The packet information storage unit 403 is a database for storing information about a packet determined as possibly contributing to the inhibition of the power saving mode. The entity of information stored in the packet information storage unit 403 is stored in the memory unit 205.

The factor analysis unit 404 is a function module for classifying the information about the packet stored in the packet information storage unit 403 by a transmission source address and a packet content, analyzing influence on the power saving mode, and storing it in the analysis result storage unit 405.

The analysis result storage unit 405 is a database for storing analysis result in the factor analysis unit 404. The entity of information stored in the analysis result storage unit 405 is stored in the memory unit 205.

The analysis result notification unit 406 is a function module for notifying an administrator of the analysis result stored in the analysis result storage unit 405 through means of a preset electronic mail.

Figure 5:
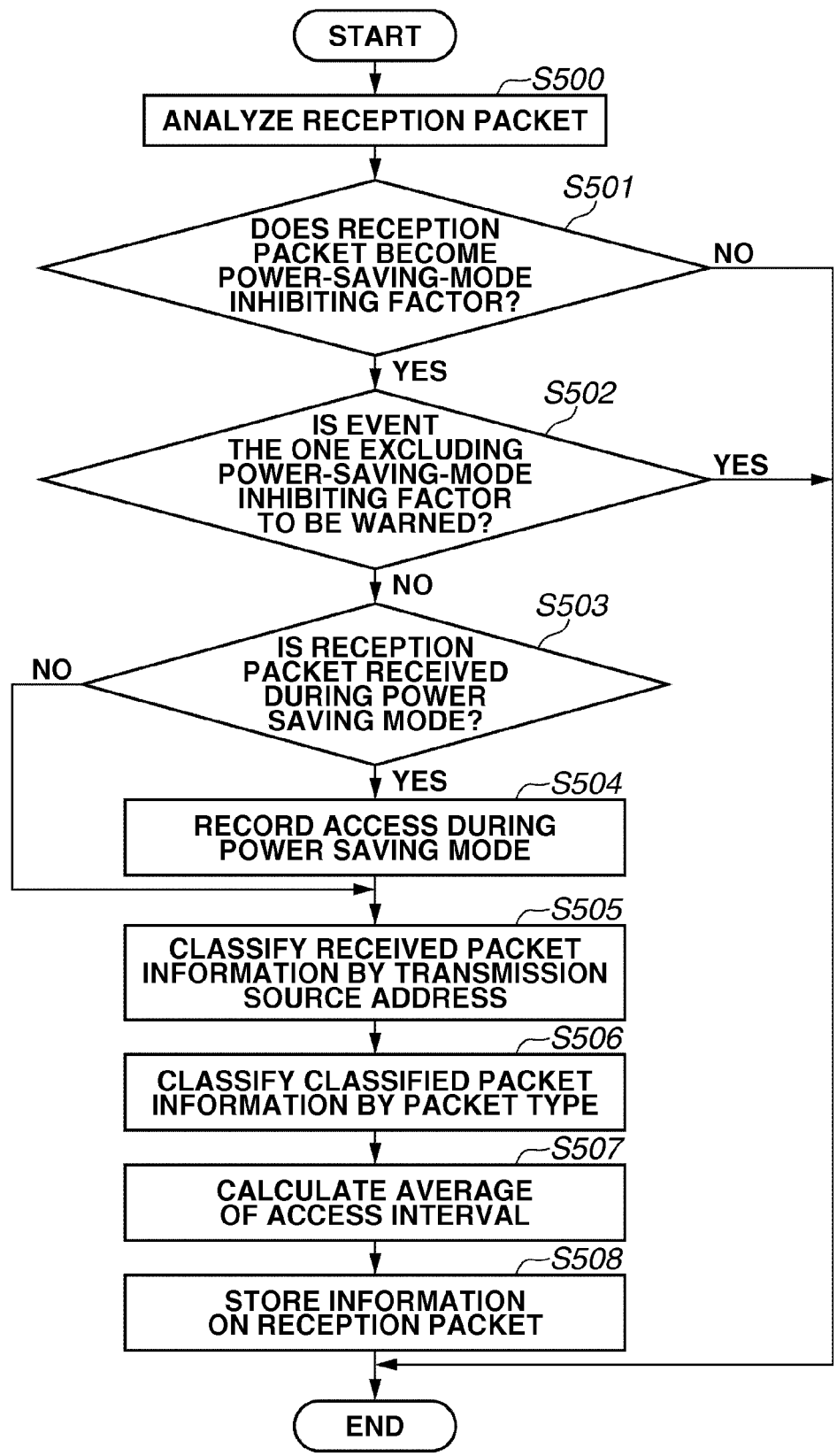
FIG. 5 is a flow chart indicating the operation of a packet analysis unit in a first exemplary embodiment.

FIG. 5 is a flow chart indicating an operation in a case where the packet analysis unit 402 stores inquiries (information of a reception packet) from the computers 120, 121, 122, and 123 in the packet information storage unit 403. The process of the flow chart is realized by the core control unit 200 reading and executing the program recorded in the memory unit 205.

When a packet is received by the network monitor unit 401, the packet is delivered to the packet analysis unit 402 and the packet analysis unit 402 starts the process of the flow chart.

In step S500, the packet analysis unit 402 analyzes a packet (hereinafter referred to as a reception packet) received via the network monitor unit 401. The processing proceeds to step S501. In step S500, the protocol of the received packet and the contents of request are analyzed.

In step S501, the packet analysis unit 402 determines whether the reception packet may contribute to the inhibition of the power-saving-mode based on the analysis result in step S500. In the present exemplary embodiment, a request for causing the multifunctional device 110 to respond is determined as the power-saving-mode inhibiting factor.

If the packet analysis unit 402 determines that the reception packet does not contribute to the inhibition of the power saving mode (NO in step S501), the packet analysis unit 402 determines that the reception packet does not contribute to the inhibition of the power saving mode, and the process of the flow chart is ended. If the packet analysis unit 402 determines that the reception packet contributes to the inhibition of the power saving mode (YES in step S501), the packet analysis unit 402 causes the processing to proceed to step S502.

The OS such as Windows (registered trademark) Vista is provided with a function to cause the SNMP packet to periodically inquire of a printer in which a driver is installed, about the status of the printer. Typically, the request for causing the multifunctional device 110 to respond like the inquiry of the SNMP packet about the status contributes to the inhibition of the power saving mode of the multifunctional device 110. The multifunctional device 110 of the present exemplary embodiment is configured to return a response to accesses from the computer which are expected to frequently occur without affecting the power saving mode. In the present exemplary embodiment, information (such as transmission source address, protocol, and contents of request) about a packet which is excluded from the power-saving-mode inhibiting factors to be warned of can be set by the user previously setting from the application 306. The setting is stored in the memory unit 205.

In step S502, the packet analysis unit 402 determines whether the reception packet is information about a packet which is excluded from the previously set power-saving-mode inhibiting factors to be warned of based on the result analyzed in step S500.

If the packet analysis unit 402 determines that the reception packet is information about a packet which is excluded from the previously set power-saving-mode inhibiting factors to be warned of (YES in step S502), the process of the flowchart is ended. On the other hand, if the packet analysis unit 402 determines that the reception packet is not information about a packet which is excluded from the previously set power-saving-mode inhibiting factors to be warned of (NO in step S502), the packet analysis unit 402 causes the processing to proceed to step S503.

In step S503, the packet analysis unit 402 determines whether the reception packet is the packet received during the power saving mode based on the result analyzed in step S500 (reception determination during the power saving mode). If the packet analysis unit 402 determines that the reception packet is not the packet received during the power saving mode (NO in step S503), the packet analysis unit 402 causes the processing to proceed to step S505. On the other hand, if the packet analysis unit 402 determines that the reception packet is the packet received during the power saving mode (YES in step S503), the packet analysis unit 402 causes the processing to proceed to step S504.

In step S504, the packet analysis unit 402 records that the reception packet is the one that is received during the power saving mode. More specifically, information indicating that the packet is received during the power saving mode is added to the analysis result in step S500. The processing proceeds to step S505. Many multifunctional devices with the power saving mode notify a computer of timing at which the device shifts to the power saving mode by multicast of a service location protocol (SLP). Similarly, it is assumed that the multifunctional device 110 according to the present exemplary embodiment has a function to notify a computer of timing at which the device shifts to the power saving mode. Therefore, in step S503, if the packet analysis unit 402 determines that the reception packet is the one received during the power saving mode, the packet analysis unit 402 determines that the application program operating on the transmission source computer does not correspond to a function to notify of shift to the power saving mode and records that the reception packet is the one received during the power saving mode in step S504.

In step S505, the packet analysis unit 402 classifies the received packet information by a transmission source address with reference to the existing information stored in the packet information storage unit 403. The packet analysis unit 402 causes the processing to proceed to step S506.

In step S506, the packet analysis unit 402 classifies the packet information classified by a transmission source address in the above step S505 by the contents of a packet (type). The processing proceeds to step S507.

In step S507, the packet analysis unit 402 extracts a packet similar in content to that transmitted from the same transmission source address as the above reception packet classified in the above steps S505 and S506 and calculates the average of access intervals of the extracted plurality of packets. The processing proceeds to step S508.

In step S508, the packet analysis unit 402 stores information on the reception packet (including information added in step S504 and information calculated in step S507) which is determined as the power-saving-mode inhibiting factor in steps S501 and S502 in the packet information storage unit 403. The process of the flow chart is ended.

Figure 6:
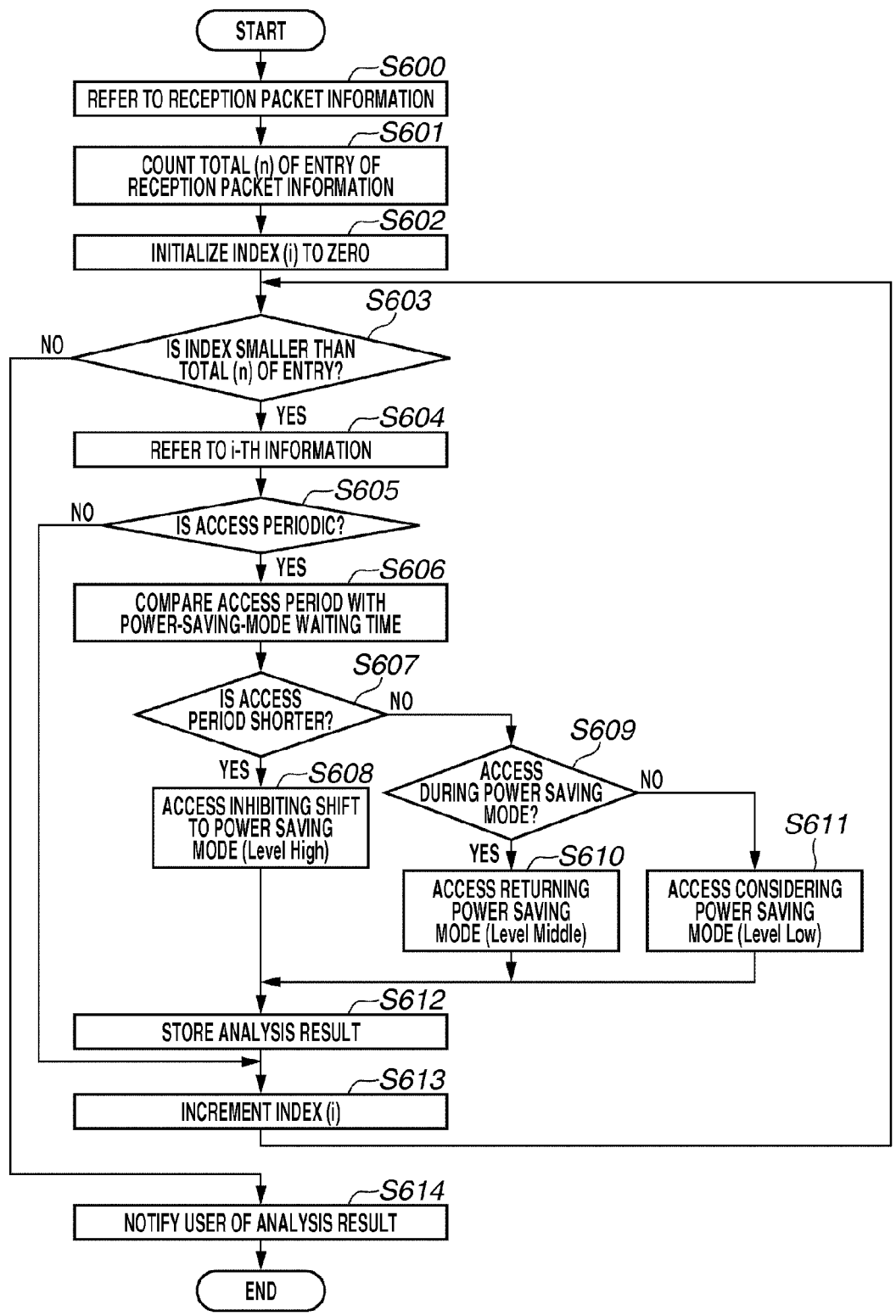
FIG. 6 is a flow chart indicating operation for notifying the user of the power-saving-mode inhibiting factor by a factor analysis unit and an analysis result notification unit in the first exemplary embodiment.

FIG. 6 is a flow chart indicating operation for notifying the user of the power-saving-mode inhibiting factor performed by the factor analysis unit 404 and the analysis result notification unit 406 in the first exemplary embodiment. The process of the flow chart is realized by the core control unit 200 reading and executing the program recorded in the memory unit 205.

The general control unit 400 starts the process of the flow chart at a timing according to the period previously set in the memory unit 205 of the multifunctional device 110. The general control unit 400 can also start the process of the flow chart when an instruction for notifying the user of the power-saving-mode inhibiting factor is input from the operation unit 203 or external devices of the computers 120 to 123.

In step S600, the factor analysis unit 404 reads the reception packet information stored in the packet information storage unit 403 and causes the processing to proceed to step S601.

In step S601, the factor analysis unit 404 counts the total (n) of entries of the reception packet information read in the above step S600 and causes the processing to proceed to step S602.

In step S602, the factor analysis unit 404 initializes an index (i) for counting the entries of the reception packet information read from the packet information storage unit 403 in step S600 to "0" and causes the processing to proceed to step S603.

In step 603, the factor analysis unit 404 determines whether the index (i) initialized in step S602 is smaller than the total (n) of entries of the reception packet information calculated in step S601. If the factor analysis unit 404 determines that the index (i) is equal to or greater than the total (n) of entries of the reception packet information (NO in step S603), the factor analysis unit 404 causes the processing to proceed to step S614.

If the factor analysis unit 404 determines that the index (i) is smaller than the total (n) of entries of the reception packet information (YES in step S603), the factor analysis unit 404 causes the processing to proceed to step S604.

In step S604, the factor analysis unit 404 reads the i-th reception packet information stored in the packet information storage unit 403 and causes the processing to proceed to step S605.

In step S605, the factor analysis unit 404 determines whether the i-th reception packet information is a periodic access with reference to the access interval (average) calculated in step S507 in FIG. 5 within the i-th reception packet information read in step S604. In step S605, even if the i-th reception packet information is a periodic access, if the i-th reception packet information is an access period exceeding a predetermined threshold, it is determined that the influence of the access on power saving mode is small and the access is not analyzed. In the application 306 of the present exemplary embodiment, the user can set a threshold with respect to presence and absence of periodicity of the received packet information. The threshold is stored in the memory unit 205. If the access interval exceeds the threshold, the factor analysis unit 404 determines that, even if the i-th reception packet information is an entry related to a periodically received packet information, the influence of the entry over the power saving mode is small. Then the factor analysis unit 404 determines that the reception packet information is an entry of non-periodic packet information (NO in step S605) and causes the processing to proceed to step S613.

If the access interval does not exceed the threshold, the factor analysis unit 404 determines that the i-th reception packet information is an entry of periodic packet information (YES in step S605) and causes the processing to proceed to step S606.

In the present exemplary embodiment, the non-periodic packet information is filtered in step S605 to take only the periodic packet information as the object of the subsequent analysis processes. In the subsequent steps S606 to S611, the factor analysis unit 404 compares the access period of the periodic packet information with the waiting time of the power saving mode to analyze a power-saving-mode inhibition degree and classify accesses though a plurality of packets by the degree. The processes are described in detail below.

In step S606, the factor analysis unit 404 compares the access interval of the i-th reception packet information with the waiting time of the power saving mode (previously set by the multifunctional device 110 and stored in the memory unit 205) and causes the processing to proceed to step S607.

In step S607, the factor analysis unit 404 determines whether the access period of the reception packet information is shorter than the waiting time of the power saving mode based on the comparison result in step S606.

If the factor analysis unit 404 determines that the access period of the reception packet information is shorter than the waiting time of the power saving mode (YES in step S607), the factor analysis unit 404 causes the processing to proceed to step S608. If the access interval of the reception packet information is shorter than the waiting time of the power saving mode, the multifunctional device 110 never moves to the power saving mode. For this reason, in step S608, the factor analysis unit 404 analyzes the influence on the power saving mode as "large (HIGH)" because the i-th reception packet information becomes a factor for completely inhibiting the shift to the power saving mode and causes the processing to proceed to step S612.

If the factor analysis unit 404 determines that the access period of the reception packet information is not shorter than the waiting time of the power saving mode (NO in step S607), the factor analysis unit 404 causes the processing to proceed to step S609.

In step S609, the factor analysis unit 404 refers to the information recorded in step S504 out of the i-th reception packet information read in step S604 to determine whether the information is an access during the power saving mode.

If the factor analysis unit 404 determines that the information is an access during the power saving mode (YES in step S609), the factor analysis unit 404 causes the processing to proceed to step S610. If the factor analysis unit 404 determines that the information is not an access during the power saving mode (NO in step S609), the factor analysis unit 404 causes the processing to proceed to step S611.

The multifunctional device 110 in the present exemplary embodiment has a function to notify the user of the aforementioned timing at which the device shifts to the power saving mode. For this reason, if an access occurs during the power saving mode, the factor analysis unit 404 determines that the application program does not correspond to notification of shift to the power saving mode from the multifunctional device 110.

In step S610, the factor analysis unit 404 determines that the i-th reception packet information is the access considering the waiting time of the power saving mode but not considering shift to the power saving mode and causes the processing to proceed to step S612. In step S610, the i-th reception packet information does not completely inhibit shift from the normal mode to the power saving mode, but becomes a factor for returning to the normal mode from the power saving mode, so that the factor analysis unit 404 analyzes the influence on the power saving mode as "middle (MID)." The processing proceeds to step S612.

In step S611, the factor analysis unit 404 determines that the i-th reception packet information becomes a factor for delaying shift to the power saving mode from the determination results in steps S607 and S609 and causes the processing to proceed to step S612. The reception packet information to be determined in step S611 neither completely inhibits shift to the power saving mode nor performs access for returning to the power saving mode, so that the factor analysis unit 404 analyzes the influence on the power saving mode as "small (LOW)." The factor analysis unit 404 determines the reception packet information as an access considering the power saving mode and causes the processing to proceed to step S612.

In step S612, the factor analysis unit 404 stores the analysis results in steps S608, S610, or S611 with the i-th reception packet information in the analysis result storage unit 405 and causes the processing to proceed to step S613.

In step S613, the factor analysis unit 404 increments the index (i) and causes the processing to return to step S603.

In step S603, if the factor analysis unit 404 determines that the index (i) is smaller than the total (n) of entries of the reception packet information, the factor analysis unit 404 repeats the processes in steps S604 to S613.

In step S603, if the factor analysis unit 404 determines that the index (i) is equal to or greater than the total (n) of entries of the reception packet information, the factor analysis unit 404 causes the processing to proceed to step S614.

In step S614, the analysis result notification unit 406 notifies the previously set user of the analysis result stored in the analysis result storage unit 405 in step S612 and ends the process of the flow chart. The setting of the user to be notified is stored in the memory unit 205. The notification method in step S614 includes electronic mail, display on a computer of the user to be notified, display on the display panel of the operation unit 203, and a report output. The notification method is not particularly limited in the present invention.

If notification is made by electronic mail, the mail address of the user to be notified should be previously set. For display on a computer of the user to be notified, the IP address of the computer of the user to be notified is set and displayed on the computer of the IP address by popup. If notification is made by report output, printing is performed by the multifunctional device 110, the IP address of a printer used by the user to be notified and a facsimile number are previously set to perform printing by the printer of the IP address, or facsimile is transmitted to the facsimile number.

FIG. 7 illustrates an example of results of an analysis process of a power-saving-mode inhibiting factor in the application 306 operated on the multifunctional device 110 according to the first exemplary embodiment. In FIG. 7, in a column 700, there is indicated the transmission source address of a packet received via the network interface unit 201.

In a column 701, there is indicated the access period calculated by the packet analysis unit 402 in FIG. 5. In a column 702, there is indicated the communication protocol of the reception packet analyzed by the packet analysis unit 402 in FIG. 5.

In a column 703, there is indicated information about the contents of the reception packet analyzed by the packet analysis unit 402 in step S500 in FIG. 5 as is the case with the column 702. If an SNMP packet is received, the contents of the type of request (get-request/set-request/get-next-request) and (management information base) MIB, for example, are written in the column 703.

In a column 704, there is indicated the degree of influence on the power saving mode analyzed by the factor analysis unit 404 in steps S608, S610, and S611 in FIG. 6.

As described above, the administrator of the multifunctional device 110 can correctly (in detail) grasp the degree of influence of an external access on the power saving mode and easily confirm whether an unnecessary access exists by referring to the analysis result illustrated in FIG. 7.

A second exemplary embodiment is described below with reference to drawings. The system described in the second exemplary embodiment includes the same hardware and software as those of the first exemplary embodiment.

Figure 8:
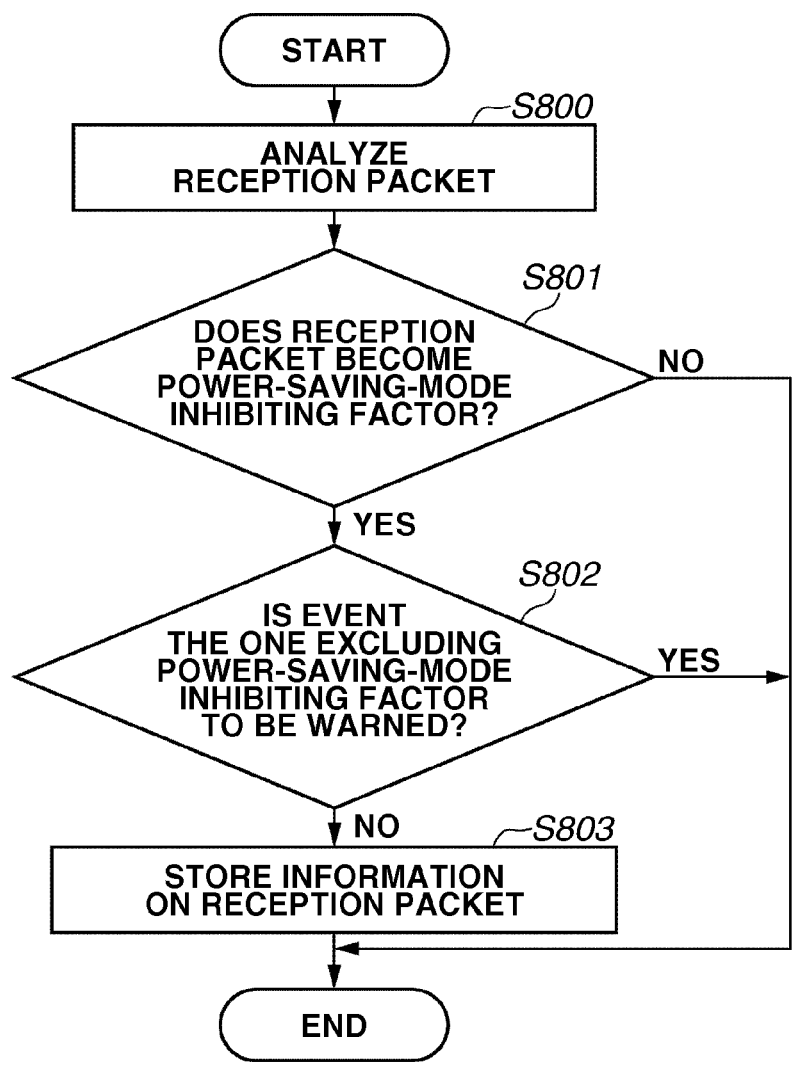
FIG. 8 is a flow chart indicating the operation of a packet analysis unit in a second exemplary embodiment.

FIG. 8 is a flow chart indicating the operation of the packet analysis unit 402 in storing inquiries (reception packet information) from the computers 120, 121, 122, and 123 in the packet information storage unit 403 in the second exemplary embodiment. The process of the flowchart is realized by the core control unit 200 reading and executing the program recorded in the memory unit 205.

When a packet is received by the network monitor unit 401, the packet is delivered to the packet analysis unit 402 and the packet analysis unit 402 starts the process of the flow chart.

In step S800, the packet analysis unit 402 analyzes a packet (hereinafter referred to as a reception packet) received via the network monitor unit 401. As is the case with step S500 in FIG. 5, in step S800, the protocol of the received packet and the contents of request are analyzed.

In step S801, the packet analysis unit 402 determines whether the reception packet contributes to the inhibition of the power saving mode based on the analysis result in step S800. If the packet analysis unit 402 determines that the reception packet does not contribute to the inhibition of the power saving mode (NO in step S501), the packet analysis unit 402 determines that the reception packet does not contribute to the inhibition of the power saving mode and ends the process.

If the packet analysis unit 402 determines that the reception packet contributes to the inhibition of the power saving mode (YES in step S801), the packet analysis unit 402 determines that the reception packet contributes to the inhibition of the power saving mode and causes the processing to proceed to step S802. The details of step S801 are similar to those of step S501 in FIG. 5.

In step S802, the packet analysis unit 402 determines whether the reception packet is information about a packet which is excluded from the previously set power-saving-mode inhibiting factors to be warned of based on the result analyzed in step S800.

If the packet analysis unit 402 determines that the reception packet is information about a packet which is excluded from the previously set power-saving-mode inhibiting factors to be warned of (YES in step S802), the process of the flowchart is ended. On the other hand, if the packet analysis unit 402 determines that the reception packet is not information about a packet which is excluded from the previously set power-saving-mode inhibiting factors to be warned of (NO in step S802), the packet analysis unit 402 causes the processing to proceed to step S803. The details of step S802 are similar to those of step S502 in FIG. 5.

In step S803, the packet analysis unit 402 stores information on the reception packet which is determined as the power-saving-mode inhibiting factor and an object to be warned of in steps S801 and S802 respectively, in the packet information storage unit 403 and ends the process of the flow chart.

Figure 9:
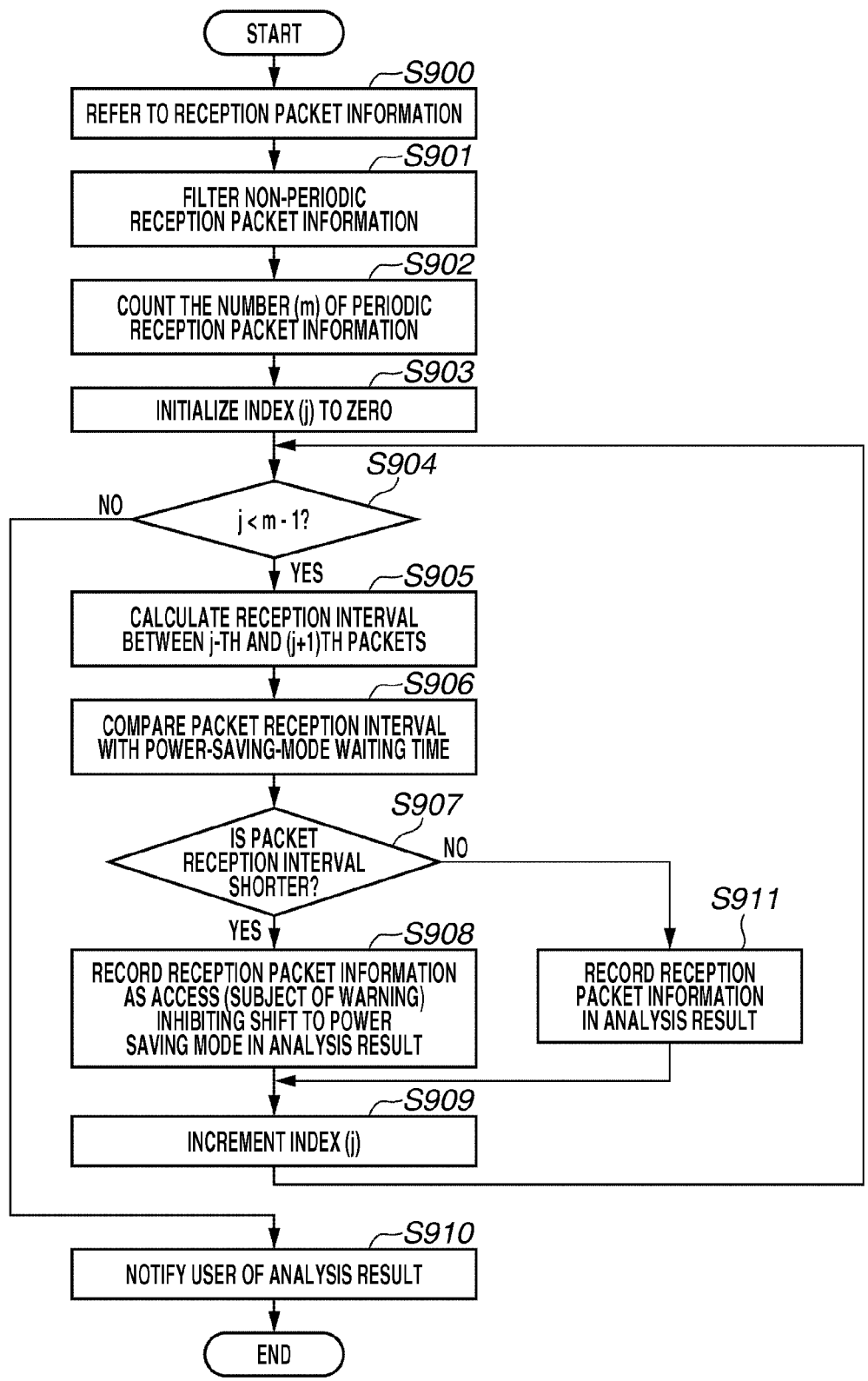
FIG. 9 is a flow chart indicating operation for notifying the user of the power-saving-mode inhibiting factor by a factor analysis unit and an analysis result notification unit in the second exemplary embodiment.

FIG. 9 is a flow chart indicating operation for notifying the user of the power-saving-mode inhibiting factor performed by the factor analysis unit 404 and the analysis result notification unit 406 in the second exemplary embodiment. The process of the flow chart is realized by the core control unit 200 reading and executing the program recorded in the memory unit 205.

The general control unit 400 starts the process of the flow chart at a timing according to the period previously set in the memory unit 205 of the multifunctional device 110. The general control unit 400 can also start the process of the flow chart when an instruction for notifying the user of a factor for inhibiting transfer to the power saving mode is input from the operation unit 203 or external devices of the computers 120 to 123.

In step S600, the factor analysis unit 404 reads the reception packet information stored in the packet information storage unit 403 and causes the processing to proceed to step S901.

In step S901, the factor analysis unit 404 filters a non-periodic reception packet information out of the reception packet information read from the packet information storage unit 403 in step S900 and causes the processing to proceed to step S902.

In the application 306 of the present exemplary embodiment, the user can set a threshold with respect to presence and absence of periodicity of the received packet information. The threshold is stored in the memory unit 205. The factor analysis unit 404 determines that the packet in which the access interval exceeds the threshold exercises a small influence on the power saving mode even if the packet is an entry related to a periodically received packet information. The factor analysis unit 404 determines that the packet is an entry of non-periodic packet information.

On the other hand, in step S901, the factor analysis unit 404 determines that the packet in which the access interval does not exceed the threshold is an entry of periodic packet information and extracts the packet.

In step S902, the factor analysis unit 404 counts the number (m) of the reception packet information determined as periodic in step S901 out of information read in step S900 and causes the processing to proceed to step S903.

In step S903, the factor analysis unit 404 initializes an index (j) for counting a periodic reception packet information to "0" and causes the processing to proceed to step S904.

In step S904, the factor analysis unit 404 determines whether the index (j) initialized in step S903 is smaller than the number (m)−1 of the periodic reception packets calculated in step S902. If the factor analysis unit 404 determines that the index (j) is equal to or greater than the number (m)−1 of the periodic reception packets (NO in step S904), the factor analysis unit 404 causes the processing to proceed to step S910.

If the factor analysis unit 404 determines that the index (j) is smaller the number (m)−1 of the periodic reception packets (YES in step S904), the factor analysis unit 404 causes the processing to proceed to step S905.

In step S905, the factor analysis unit 404 calculates the packet reception interval between the j-th and the (j+1)th packets out of the periodic reception packet information read from the packet information storage unit 403 and causes the processing to proceed to step S906.

In step S906, the factor analysis unit 404 compares the packet reception interval between the j-th and the (j+1)th packets calculated in step S905 with the waiting time of the power saving mode previously set by the multifunctional device 110 and stored in the memory unit 205 and causes the processing to proceed to step S907.

In step S907, the factor analysis unit 404 determines whether the reception interval is shorter than the waiting time of the power saving mode (previously set by the multifunctional device 110 and stored in the memory unit 205) based on the comparison result in step S906.

If the factor analysis unit 404 determines that the reception interval is shorter than the waiting time of the power saving mode (YES in step S907), the factor analysis unit 404 causes the processing to proceed to step S908.

In step S908, the factor analysis unit 404 records the reception packet information of the j-th and the (j+1)th access along with information indicating that the reception packet information is the access (to be warned of) inhibiting a shift to the power saving mode, in the analysis result storage unit 405 and causes the processing to proceed to step S909.

If the factor analysis unit 404 determines that the reception interval is not shorter than the waiting time of the power saving mode (NO in step S907), the factor analysis unit 404 causes the processing to proceed to step S911.

In step S911, the factor analysis unit 404 records the reception packet information of the j-th access in the analysis result storage unit 405 and causes the processing to proceed to step S909.

In step S909, the factor analysis unit 404 increments the index (j) and returns the processing to step S904.

If the factor analysis unit 404 determines that the index (j) is smaller the number (m)−1 of the periodic reception packets (YES in step S904), the factor analysis unit 404 performs control to repeat the processes from steps S905 to S909.

If the factor analysis unit 404 determines that the index (j) is equal to or greater than the number (m)−1 of the periodic reception packets (NO in step S904), the factor analysis unit 404 causes the processing to proceed to step S910.

In step S910, the analysis result notification unit 406 notifies the previously set user of the analysis result stored in the analysis result storage unit 405 in step S612 and ends the process of the flow chart. The notification method in step S910 is similar to that in step S614 in FIG. 6.

FIG. 10 illustrates an example of results of an analyzing process of a power-saving-mode inhibiting factor in the application 306 operating on the multifunctional device 110 according to the second exemplary embodiment.

In FIG. 10, in a column 1000, there is indicated a time at which a packet is received. In a column 1001, there is indicated the transmission source address of a packet received via the network interface unit 201. In a column 1002, there is indicated the communication protocol of the reception packet analyzed by the packet analysis unit 402.

In a column 1003, there is indicated information about the contents of the reception packet analyzed by the packet analysis unit 402. If the SNMP packet is received, the contents of the type of request (get-request/set-request/get-next-request) and (management information base) MIB are written in the column 1003.

Accesses (to be warned of) inhibiting a shift to the power saving mode determined in step S907 in FIG. 9 are indicated by 1004-1, 1004-2, 1004-3, 1004-4, and 1004-5. The accesses 1004-1, 1004-2, 1004-3, 1004-4, and 1004-5 are transferred in a form in which the accesses can be readily discriminated from other accesses (which do not inhibit a shift to the power saving mode).

The user may be notified only of the accesses (to be warned of) inhibiting a shift to the power saving mode (i.e., only 1004-1, 1004-2, 1004-3, 1004-4, and 1004-5).

As described above, the administrator of the multifunctional device 110 can correctly grasp the degree of influence of an external access on the power saving mode and easily confirm whether an unnecessary access exists by referring to the analysis result illustrated in FIG. 10.

In the present exemplary embodiment, data and time on and at which the multifunctional device 110 shifts to the power saving mode and returns from the power saving mode are recorded in a log, thereby the factor analysis unit 404 may determine whether the j-th access is the one during the power saving mode, based on the log in step S911 in FIG. 9. If the reception packet information of the j-th access is an access during the power saving mode, the reception packet information of the j-th access is recorded in the analysis result storage unit 405 along with information indicating that the reception packet information of the j-th access is the access returning the device to the power saving mode. On the other hand, if the reception packet information of the j-th access is not an access during the power saving mode, the reception packet information of the j-th access is recorded in the analysis result storage unit 405 along with information indicating that the reception packet information of the j-th access is the access considering the power saving mode. Furthermore, in step S910 in FIG. 9, the analysis result notification unit 406 may notify the user of the analysis result in such a form that each access can be readily discriminated whether it is an access (to be warned of) inhibiting a shift to the power saving mode, an access returning the device to the power saving mode, or an access considering the power saving mode.

As described above, the administrator of the multifunctional device 110 can adequately grasp the degree of influence of an external access on the power saving mode and easily confirm whether an unnecessary access exists by referring to the analysis result illustrated in FIG. 10.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-007763 filed Jan. 18, 2010, which is hereby incorporated by reference herein in its entirety.

What is claimed is:

1. A multifunctional device which is communicable with an external device via a network and shifts to a power saving mode in a case where a specific request is not made within a waiting time of the power saving mode, the multifunctional device comprising:

a determination unit configured to determine whether a packet received via the network is an inhibition packet inhibiting a shift to the power saving mode or a maintenance of the power saving mode;

a storage unit configured to store the time at which a packet is received and information indicating whether a packet is received during the power saving mode as information about the inhibition packet determined by the determination unit;

a calculation unit configured to calculate an interval of access using a plurality of packets by an analysis of the plurality of packets based on the information about the packet stored in the storage unit;

an analysis unit configured to compare the interval of access calculated by the calculation unit with the waiting time of the power saving mode to analyze the degree of inhibition of the power saving mode and classify accesses by the plurality of packets according to the degree; and a notification unit configured to provide notification of results analyzed by the analysis unit; wherein the analysis unit classifies the access of which the interval is shorter than the waiting time of the power saving mode into an access inhibiting a shift to the power saving mode and classifies the access of which the interval is not shorter than the waiting time of the power saving mode and which is made by the packet received during the power saving mode, into an access returning from the power saving mode.

2. The multifunctional device according to claim 1, further comprising an extraction unit configured to extract information about a packet of which the interval of access calculated by the calculation unit is shorter than a threshold, wherein the analysis unit analyzes the access by the packet extracted by the extraction unit.

3. The multifunctional device according to claim 1, further comprising a registration unit configured to previously register information about a packet not to be warned of, wherein the information about a packet registered as a packet not to be warned of in the registration unit is not stored in the storage unit even if the inhibition packet is determined by the determination unit.

4. The multifunctional device according to claim 1, wherein the determination unit determines that a packet requesting a response is the inhibition packet.

5. The multifunctional device according to claim 1, wherein the storage unit further stores the transmission source and the contents of a request of a packet as information about a packet and the calculation unit classifies the packets according to the transmission source and the contents of a request of a packet information stored in the storage unit to calculate the interval of the packets that show the same transmission source and contents of a request.

6. The multifunctional device according to claim 1, wherein the analysis unit classifies the access of which the interval is not shorter than the waiting time of the power saving mode and which is made by the packet not received during the power saving mode, into an access not inhibiting a shift to the power saving mode, but an access delaying a shift to the power saving mode.

7. A control method in a multifunctional device which is communicable with an external device via a network and shifts to a power saving mode in a case where a specific request is not made within a waiting time of the power saving mode, the control method comprising:

determining whether a packet received via the network is an inhibition packet inhibiting a shift to the power saving mode or a maintenance of the power saving mode;

storing the time at which a packet is received and information indicating whether a packet is received during the power saving mode as information about the inhibition packet determined by the determining;

calculating an interval of access using a plurality of packets by an analysis of the plurality of packets based on the information about the stored packet;

comparing the interval of access with the waiting time of the power saving mode to analyze the degree of inhibition of the power saving mode and classify accesses by the plurality of packets according to the degree; and providing notification of the analysis results; wherein in the analyzing, the access of which the interval is shorter than the waiting time of the power saving mode is classified into an access inhibiting a shift to the power saving mode and the access of which the interval is not shorter than the waiting time of the power saving mode and which is made by the packet received during the power saving mode is classified into an access returning from the power saving mode.

8. A computer readable storage medium on which is stored a computer program for making a computer execute a method for a multifunctional device which is communicable with an external device via a network and shifts to a power saving mode in a case where a specific request is not made within a waiting time of the power saving mode, the method comprising the steps of:

determining whether a packet received via the network is an inhibition packet a shift to the power saving mode or a maintenance of the power saving mode;

storing the time at which a packet is received and information indicating whether a packet is received during the power saving mode as information about the inhibition packet determined by the determining;

calculating an interval of access using a plurality of packets by an analysis of the plurality of packets based on the information about the stored packet;

comparing the interval of access with the waiting time of the power saving mode to analyze the degree of inhibition of the power saving mode and classify accesses by the plurality of packets according to the degree; and providing notification of the analysis results; wherein in the analyzing, the access of which the interval is shorter than the waiting time of the power saving mode is classified into an access inhibiting a shift to the power saving mode and the access of which the interval is not shorter than the waiting time of the power saving mode and which is made by the packet received during the power saving mode is classified into an access returning from the power saving mode.

* * * * *